United States Patent Office 2,729,686
Patented Jan. 3, 1956

2,729,686

AROMATIZATION OF ORGANIC CHLORINE COMPOUNDS

David D. Humphreys, Baton Rouge, La., assignor to Ethyl Corporation, New York, N. Y., a corporation of Delaware No Drawing. Application November 12, 1952,
Serial No. 320,139

3 Claims. (Cl. 260—650)

This invention relates to aromatization of organic chlorine compounds and more particularly to a new and improved process for the catalytic conversion of hexachlorocyclohexanes to aromatic chlorohydrocarbons.

The dehydrochlorination of benzene hexachloride has been traditionally carried out by thermal treatment at temperatures in the vicinity of 275–500° C., usually in the presence of a catalyst, such as iron or ferric chloride. This is a suitable method for the preparation of aromatic compounds such as trichlorobenzenes, particularly when a market outlet for the non-gamma isomers of benzene hexachloride is thereby provided. However, this procedure is inefficient in that large quantities of 1,2,3-trichlorobenzene, for which there exists no market outlet, are produced along with the desired 1,2,4- isomer. The 1,3,5-isomer is produced only in negligible amounts. The dehydrochlorination product, therefore, must be purified by a difficult and costly fractionation operation or the crude mixture must be sold at a reduced premium. Further disadvantages of this method of dehydrochlorination of benzene hexachloride lie in the fact that the reaction rate is somewhat slow at practicable temperatures, thus limiting the production per unit amount of equipment, and that, in order to increase the reaction rate to a more economical velocity, excessive temperatures must be employed.

In addition the hydrogen chloride produced by this method is ordinarily contaminated with varying amounts of organic material, and in order to recover this hydrogen chloride in pure form it is necessary to contact it with an adsorbent for organic compounds to obtain pure hydrogen chloride gas. Furthermore, the mixture of trichlorobenzene produced by this means is usually highly colored and must be extensively treated to remove the color.

Another method used for the dehydrochlorination of benzene hexachloride consists of heating the benzene hexachloride with a solution of alkali, such as sodium hydroxide or potassium hydroxide. This procedure is extremely inefficient in that the valuable hydrogen chloride produced in the dehydrochlorination is converted by the action of the alkali into relatively valueless sodium chloride or potassium chloride respectively.

In the formation of benzene hexachloride by addition chlorination of benzene, varying amounts of monochlorobenzene hexachloride and dichlorobenzene hexachloride are usually formed. The dehydrochlorination of these compounds would lead to the formation of valuable compounds, such as tetrachlorobenzenes and pentachlorobenzene.

A principal object of my invention, therefore, is to provide a new and improved method for the dehydrochlorination of hexachlorocylclohexanes. Another object is to provide a catalytic process for producing a mixture of trichlorobenzenes in which 1,2,4-trichlorobenzene predominates over 1,2,3-trichlorobenzene to a degree not heretofore achieved.

It has now been discovered that benzene hexachloride and related compounds, such as monochlorobenzene hexachloride and dichlorobenzene hexachloride can be readily and efficiently catalytically dehydrochlorinated in a high reaction rate to yield mixtures of isomeric polychlorobenzenes by contacting the polychlorocyclohexane with a selective, highly specific catalyst as described hereafter. In the case of benzene hexachloride, the proportion of 1,2,4-trichlorobenzene is markedly higher than has heretofore been obtained.

The organic chlorine compounds to which my invention is applicable include hexachlorocyclohexanes. By this term is meant a cyclohexane having at least six chlorine atoms in the ring. The preferred members of this class of compound in my invention are benzene hexachloride, monochlorobenzene hexachloride, and dichlorobenzene hexachloride. Benzene hexachloride is particularly preferred. By benzene hexachloride I mean either a total stereoisomeric mixture of 1,2,3,4,5,6-hexachlorocyclohexanes, such as is produced in the additive chlorination of benzene (hereafter designated as "crude" benzene hexachloride), or any of the individual 1,2,3,4,5,6-hexachlorocyclohexane stereoisomers or any mixture of two or more of the stereoisomeric 1,2,3,4,5,6-hexachlorocyclohexanes, including a mixture such as that arising when the gamma isomer has been removed from a stereoisomeric mixture.

The catalysts which are suitable for use in my process may be described as "animate" forms of silicon dioxide, $SiO_2$. By animate forms of $SiO_2$, or silica, I means silica which exists as the skeletons of microscopic marine plants and animals, such as the diatom. The skeletons are known under a variety of names, such as diatomaceous earth, kieselguhr, diatomite, diatomaceous silica, infusorial earth, and the like. These skeletons are quite common in nature and are found widely distributed in many areas now above the sea. They are characterized by having a very irregularly shaped surface (when viewed under the microscope), and it may be that their catalytic activity is due to this highly irregular surface, which is characterized by many sharp peaks and protuberances. At any rate, I have found that the degree of catalytic activity in the aromatization of polychlorocyclohexanes that the animate forms of silica possess is much greater than that of the "inaminate" forms of silica such as silica gel, quartz, mica, and the like.

Means of operation of my invention will be more clearly understood by reading the following examples, which illustrate my invention and contrast it with prior art methods. All parts and percentages used in all examples herein, unless otherwise stated, are parts or percentages by weight.

The first example illustrates results obtained in the prior methods of aromatizing benzene hexachloride, namely, thermal dehydrochlorination in the absence of a catalyst.

*Example I*

To a reaction vessel equipped with a mechanical agitator, a temperature measuring device, and a packed distillation column was charged crude benzene hexachloride. To the top of the packed distilling column was connected a condenser, a variable take-off distilling head containing a temperature measuring device, a distillate cooler, and a tared hydrogen chloride absorber containing sodium hydroxide solution.

The reaction vessel was heated by controlled external means, and the agitator was started as soon as the charge was fluid enough to be stirred. The reaction was considered to have started when hydrogen chloride fumes were observed. After a substantial reflux in the distillation column was established, distillate was taken off at a rate sufficient to maintain the reactor temperature at 285–295° C. during the major part of the run. The rate of dehydrochlorination was determined by periodic weighing of the amount of hydrogen chloride absorbed by the sodium hydroxide in the hydrogen chloride absorber. The 50 per cent reaction time, that is, the time required for evolution of 50 per cent of the theoretical amount of hydrogen chloride for complete conversion of the benzene hexachloride to trichlorobenzenes, was used as the criterion for velocity of the aromatization reaction. The 50 per cent reaction time in this example was 63 minutes. The temperature of the vapor in the take-off head gradually rose from about 203° C. to about 215° C. during the course of the run. The organic distillate was found by infrared analysis to comprise 1,2,4-trichlorobenzene and 1,2,3-trichlorobenzene in the ratio of only 4.36 to 1.

The following example illustrates results obtained by another prior art procedure, that of using powdered iron as the aromatization catalyst.

*Example II*

The procedure of Example I was repeated except about one part of powdered iron was present for every 100 parts of benzene hexachloride charged to the reactor. The half reaction time was reduced to 45 minutes, but the ratio of 1,2,4-trichlorobenzene to 1,2,3-trichlorobenzene was reduced to the exceedingly low value of only 2.87 to 1.

*Example III*

In contrast to the above results, when this procedure was completed with a catalyst comprising diatomaceous earth, a form of animate silica, the half life of the reaction was reduced to 36 minutes, and the ratio of 1,2,4-trichlorobenzene to 1,2,3-trichlorobenzene in the organic product reached the value of 5.16 to 1.

However, it was found that the results of Example III could not be duplicated through the use of an inanimate form of silica as is shown in the following example.

*Example IV*

Using the procedure of Example III, benzene hexachloride was aromatized with a catalyst comprising silica gel with the quantities the same as in Example II. It was found that the 50 per cent reaction time was longer than that of a comparable run using no catalyst whatsoever.

Other forms of inanimate silica, such as mica, quartz, etc., likewise give these inferior results.

When the procedure of Example III is applied to alpha benzene hexachloride, gamma benzene hexachloride, technical benzene hexachloride from which the gamma isomer has been removed, to monochlorobenzene hexachloride, or to dichlorobenzene hexachloride, substantially identical results are obtained.

My invention may be carried out as either a batch process or a continuous process. One variation of batch operation has been described in Example III above.

In the continuous embodiment, which is the preferred embodiment of my invention, molten or solid hexachlorocyclohexane is continuously charged to a pot-type vessel or tube-type vessel containing a charge of catalyst or, alternatively, hexachlorocyclohexane and catalyst can be charged to the vessel concurrently. Heat is applied to the vessel, and reaction products are continuously removed and recovered from the reaction mixture by distillation and subsequent condensation. Hydrogen chloride is continuously removed and collected in a hydrogen chloride scrubber. The mixture of products which comprises the distillate is resolved by fractional distillation or other means.

My invention is operable over a wide range of temperatures. Temperatures of at least about 180° C. are preferably employed. Generally, in order to avoid excessive losses of hexachlorocyclohexane by boiling, the temperature should not be higher than about 350° C. In the preferred process applications of my invention, I remove the liquid products produced by continuous distillation from the reaction mixture. Since the boiling point of 1,2,4-trichlorobenzene at normal pressures is about 213° C. and that of 1,2,3-trichlorobenzene is about 219° C., I prefer to operate at a temperature of at least about 220° C. The boiling points of higher chlorinated benzenes are even higher. My preferred range of temperature, therefore, lies between about 220° C. and 350° C.

The amount of catalyst employed can be varied between a very low percentage, such as about 0.01 per cent of the weight of hexachlorocyclohexane to about 10 per cent of the weight of hexachlorocyclohexane. However, percentages greater than about 2 per cent of the weight of hexachlorocyclohexane provide only minor additional benefits, so I prefer to use proportions of catalyst not greater than about 2 per cent of the weight of hexachlorocyclohexane being reacted.

In addition to the diatomaceous earth catalyst illustrated in Example III, other forms of animate silica, e. g. kieselguhr, diatomaceous silica, etc., gives similar results. Likewise, similar results are obtained when the catalysts of this invention are used to aromatize monochlorobenzene hexachloride and dichlorobenzene hexachloride.

I claim:

1. A process for aromatizing benzene hexachloride to produce trichlorobenzene having an enhanced proportion of 1,2,4-trichlorobenzene comprising heating said benzene hexachloride to a temperature of at least 180° C. in the presence of silicified skeletons of diatoms as a catalyst, said catalyst being present in a concentration of at least 0.01 percent by weight, based upon the weight of said benzene hexachloride.

2. The process of claim 1 in which the temperature is maintained between about 220–350° C.

3. The process of claim 1 in which the catalyst is diatomaceous earth.

References Cited in the file of this patent

FOREIGN PATENTS 955,816    France _____ July 4, 1949